United States Patent
K.V. et al.

(10) Patent No.: US 12,476,290 B2
(45) Date of Patent: Nov. 18, 2025

(54) SYSTEM FOR BALANCING PLURALITY OF CELLS WITHIN BATTERY PACK AND METHOD THEREOF

(71) Applicant: EXICOM TELE-SYSTEMS LIMITED, Gurgaon (IN)

(72) Inventors: Sundaraaman K.V., Bangalore (IN); Rohan Patwardhan, Bangalore (IN); Chandan Prakash, Bangalore (IN); Narayan Surendra Mahipati, Bangalore (IN)

(73) Assignee: EXICOM TELE-SYSTEMS LIMITED, Gurgaon (IN)

( * ) Notice: Subject to any disclaimer, the term of this patent is extended or adjusted under 35 U.S.C. 154(b) by 727 days.

(21) Appl. No.: 17/761,569

(22) PCT Filed: Jan. 27, 2021

(86) PCT No.: PCT/IN2021/050085
§ 371 (c)(1),
(2) Date: Mar. 17, 2022

(87) PCT Pub. No.: WO2021/152627
PCT Pub. Date: Aug. 5, 2021

(65) Prior Publication Data
US 2022/0399580 A1 Dec. 15, 2022

(30) Foreign Application Priority Data
Jan. 31, 2020 (IN) .............................. 202011004376

(51) Int. Cl.
*H02J 7/00* (2006.01)
*H01M 10/42* (2006.01)

(52) U.S. Cl.
CPC ..... *H01M 10/4257* (2013.01); *H02J 7/00036* (2020.01); *H02J 7/0019* (2013.01); *H01M 2010/4271* (2013.01)

(58) Field of Classification Search
USPC ........................................................ 320/118
See application file for complete search history.

(56) References Cited

U.S. PATENT DOCUMENTS

| 9,450,274 B2 | 9/2016 | Vo et al. | |
| 11,101,668 B2* | 8/2021 | Hidaka | H02J 7/0014 |

(Continued)

FOREIGN PATENT DOCUMENTS

EP 2618454 10/2018

OTHER PUBLICATIONS

International Search Report received in PCT/IN2021/050085, mailed May 31, 2021, 3 pages.

(Continued)

*Primary Examiner* — Samuel Berhanu
(74) *Attorney, Agent, or Firm* — Klarquist Sparkman, LLP

(57) ABSTRACT

A system (115) includes a plurality of sensors (210) to measure multiple operational parameters of each of the plurality of cells (110). The system (115) further includes a switching unit (215) and a controlling unit (235) electrically and communicably coupled to each of the plurality of cells (110). The controlling unit (235) determines an energy value ($E_{(cell-n)}$) for each of the cells (110) based on the multiple operational parameters of the cells (110), determines an energy delta ($D_n$) for the cells (110) and thereafter selectively operates the switching unit (215) for a time period ($t_n$) to allow transfer of energy from one of the cells (110) to a (Continued)

storage unit (120). Thereby, each of the cells (110) is at an ideal operating state and the plurality of cells (110) are balanced.

19 Claims, 11 Drawing Sheets

(56) References Cited

U.S. PATENT DOCUMENTS

| | | | |
|---|---|---|---|
| 2004/0113586 A1* | 6/2004 | Chen | H02J 7/0019 |
| | | | 320/118 |
| 2009/0096420 A1* | 4/2009 | Lupu | H02J 7/0016 |
| | | | 320/122 |
| 2009/0271132 A1* | 10/2009 | Furukawa | G01R 31/3835 |
| | | | 702/63 |
| 2012/0161707 A1* | 6/2012 | Kim | H02J 7/0016 |
| | | | 320/118 |
| 2014/0327400 A1* | 11/2014 | Kudo | B60L 58/22 |
| | | | 320/118 |
| 2019/0181654 A1* | 6/2019 | Hsiao | B60L 58/19 |
| 2020/0006958 A1* | 1/2020 | Wang | B60L 58/14 |
| 2020/0235588 A1* | 7/2020 | Lee | H01M 10/425 |

OTHER PUBLICATIONS

Written Opinion Report received in PCT/IN2021/050085, mailed May 31, 2021, 4 pages.

\* cited by examiner

SYSTEM FOR BALANCING PLURALITY OF CELLS WITHIN BATTERY PACK AND METHOD THEREOF

CROSS REFERENCE TO RELATED APPLICATIONS

This is the U.S. National Stage of International Application No. PCT/IN2021/050085 filed Jan. 27, 2021, which was published in English under PCT Article 21(2), which in turn claims the benefit of India application No. 202011004376, filed in India on Jan. 31, 2020. Both applications are incorporated herein in their entirety by reference.

FIELD OF THE INVENTION

The present invention relates to a battery pack, and more particularly relates to a system and method for balancing a plurality of cells within the battery pack.

BACKGROUND OF THE INVENTION

Electric energy stored in devices such as batteries are, of late, being used as energy sources in applications such as transportation, telecom, and the like. These batteries include multiple cells connected to one other in one of series, parallel, and a combination thereof and placed within a battery pack. The number of cells and capacity of the cells depend on the application the battery pack is used for.

During manufacturing of cells and assembling of the cells within the battery pack, each of the cells are graded based on one of, but not limited to, voltage and capacity. Therefore, voltage rating of each of the cells arranged within the battery pack are the same. However, during the course of operation of the battery pack, State of Charge (SOC) of each cell within the battery pack may vary. This phenomenon of variation in voltage of the cells is known as cell unbalancing. Constructional arrangement of the cells owing to which the cells at the different locations within the battery pack are exposed to different levels of heat, electro chemical reactions within the cells and so on are causes responsible for the cells to be unbalanced.

Imbalanced cells within the battery pack cause the battery pack to operate at a reduced capacity that what the battery pack was designed for, thereby leading to inefficient operation of the battery pack and reduced life of the battery pack. In order to achieve maximum efficiency of the battery pack it is necessary that the SOC and voltage levels of each of the multiple cells are maintained at an equal level.

Balancing of the cells are achieved by one of active balancing, passive balancing, and a combination thereof. Active balancing is a balancing technique that redistributes electric energy from each of the multiple cells during charge and discharge cycles of the same. More specifically, in active balancing, the battery pack is provided with components, such as, but not limited to, an inductor, a capacitor, and a combination thereof electrically coupled to the multiple cells. The components aid in transferring energy from overcharged cells to undercharged cells, and thereby maintaining the SOC and the voltage level of each of the multiple cells at an equal level. In addition, active balancing technique makes use of bi-directional fly back convertors, DC/DC convertors, or buck-boost convertors for each cell to one of transfer power and receive power, as per the SOC and voltage level of each of the multiple cells.

However, usage of additional components reduces the compactness of the battery pack, and further increases the cost of the battery pack. Further, as each of the multiple cells make use of the fly back convertors, the battery pack is susceptible to Electromagnetic Interference (EMI), additional hardware components are required to ensure the robustness of the battery pack.

In order to balance each of the multiple cells of the battery pack via passive balancing, the battery pack is provided with components, such as resistors. Accordingly, the excess energy from the overcharged cells are dissipated in the form of heat. As the excess energy is dissipated in the form of heat and not used in an efficient manner, the battery pack is considered to be inefficient. Further, due to the heat dissipated within the battery pack, the battery pack is designed such that the battery pack is capable of handling the excess heat. Further, additional components, such as sensors, needs to be provided within the battery pack to continuously monitor the battery pack and alert a user in case of emergency. In addition, the time taken to balance the multiple cells via the passive balancing is greater in comparison to time taken for balancing each of the multiple cells via active balancing.

In view of the above, an alternative system is required to balance multiple cells of the battery pack and ensure efficient operation of the battery pack.

SUMMARY OF THE INVENTION

One or more embodiments of the present invention provide a system and method for balancing a plurality of cells within a battery pack.

In one aspect of the invention, a system for balancing a plurality of cells arranged within a battery pack is disclosed. The system includes a plurality of sensors electrically coupled to the plurality of cells. The plurality of sensors is configured to measure multiple operational parameters of each of the plurality of cells. The system further includes a switching unit electrically coupled to each of the plurality of cells and a controlling unit communicably coupled to each of the plurality of sensors and the switching unit. The controlling unit is configured to determine an energy value for each of the plurality of cells based on data pertaining to the multiple operational parameters of each of the plurality of cells. Based on the energy value, the controlling unit determines an energy delta for each of the plurality of cells. The controlling unit is further configured to selectively operate the switching unit for a time period. The time period is determined based on the energy delta for each of the plurality of cells to allow transfer of energy from at least one of the plurality of cells to a storage unit. Subsequent to transfer of energy, each of the plurality of cells is at an ideal operating state, and the plurality of cells are balanced.

In another aspect of the invention, a method of balancing a plurality of cells arranged within a battery pack is disclosed. The method includes determining an energy value for each of the plurality of cells. The energy value is determined based on data pertaining to multiple operational parameters of each of the plurality of cells. The method further includes determining an energy delta for each of the plurality of cells, based on the energy value. Based on the energy delta, the controlling unit determines a time period for selectively operating a switching unit. Accordingly, the switching unit allows transfer of energy from at least one of the plurality of cells to the storage unit. Subsequent to transfer of energy, each of the plurality of cells is at an ideal operating state, and the plurality of cells are balanced.

In yet another aspect of the invention, a battery pack is disclosed. The battery pack includes a a plurality of cells arranged within the battery pack. The battery pack further includes a plurality of sensors electrically coupled to the plurality of cells to measure multiple operational parameters of each of the plurality of cells and a switching unit electrically coupled to each of the plurality of cells. The battery pack further includes a controlling unit communicably coupled to each of the plurality of sensors and the switching unit. The controlling unit is configured to receive data from the plurality of sensors pertaining to the operational parameters of each of the plurality of cells. The controlling unit further determines a plurality of energy values based on the data pertaining to the multiple operational parameters of each of the plurality of cells. Subsequent to determining the energy values, the controlling unit selects a minimal energy value from the plurality of determined energy values. The controlling unit, thereafter, determines an energy delta for each of the plurality of cells. The energy delta is a difference between the energy value of each cell and the minimal energy value. Based on the energy delta, the controlling unit determines a time period for selectively operating a switching unit. Accordingly, the switching unit allows transfer of energy from at least one of the plurality of cells to the storage unit. Subsequent to transfer of energy, each of the plurality of cells is at an ideal operating state, and the plurality of cells are balanced.

Other features and aspects of this invention will be apparent from the following description and the accompanying drawings. The features and advantages described in this summary and in the following detailed description are not all-inclusive, and particularly, many additional features and advantages will be apparent to one of ordinary skill in the relevant art, in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

Reference will be made to embodiments of the invention, examples of which may be illustrated in the accompanying figures. These figures are intended to be illustrative, not limiting. The accompanying figures, which are incorporated in and constitute a part of the specification, are illustrative of one or more embodiments of the disclosed subject matter and together with the description explain various embodiments of the disclosed subject matter and are intended to be illustrative. Further, the accompanying figures have not necessarily been drawn to scale, and any values or dimensions in the accompanying figures are for illustration purposes only and may or may not represent actual or preferred values or dimensions. Although the invention is generally described in the context of these embodiments, it should be understood that it is not intended to limit the scope of the invention to these particular embodiments.

FIG. 5 is a flow chart of a method of balancing the plurality of cells arranged within a battery pack of the FIG. 1, according to one or more embodiments of the present invention.

DETAILED DESCRIPTION OF THE INVENTION

Reference will now be made in detail to specific embodiments or features, examples of which are illustrated in the accompanying drawings. Wherever possible, corresponding or similar reference numbers will be used throughout the drawings to refer to the same or corresponding parts. References to various elements described herein, are made collectively or individually when there may be more than one element of the same type. However, such references are merely exemplary in nature. It may be noted that any reference to elements in the singular may also be construed to relate to the plural and vice-versa without limiting the scope of the invention to the exact number or type of such elements unless set forth explicitly in the appended claims. Moreover, relational terms such as first and second, and the like, may be used to distinguish one entity from the other, without necessarily implying any actual relationship or between such entities.

Figure 1:
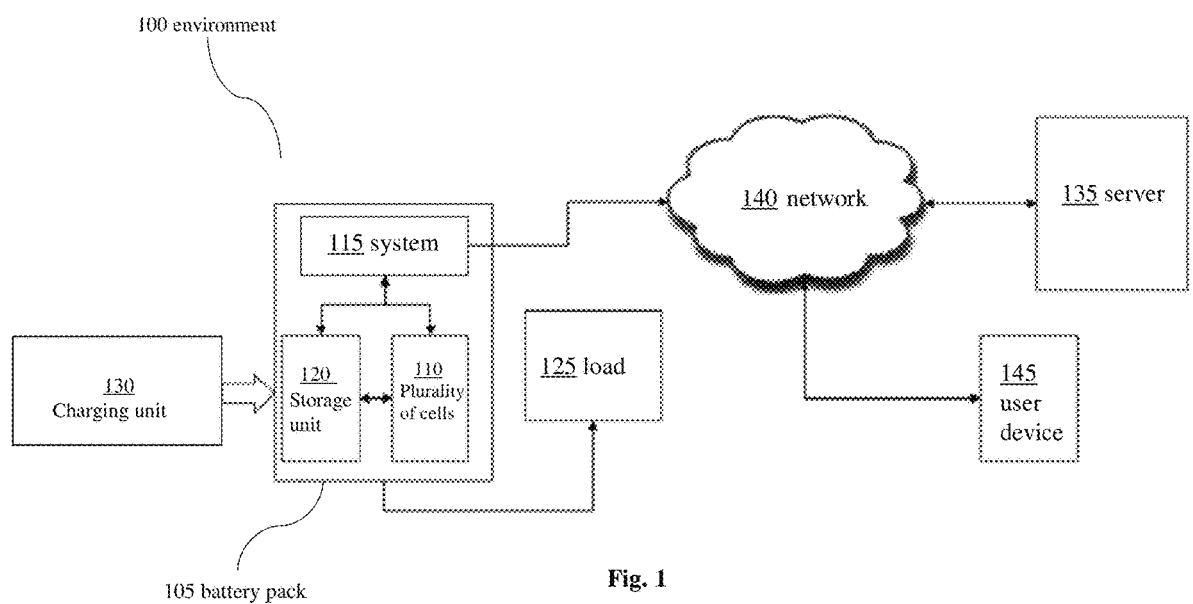
FIG. 1 is a block diagram of an environment to which a system for balancing a plurality of cells arranged within a battery pack is implemented, according to one or more embodiments of the present invention.

FIG. 1 illustrates a block diagram of an environment 100 to which a system 115 for balancing a plurality of cells 110 arranged within a battery pack 105 is implemented, according to one or more embodiments of the present invention. In the illustrated embodiment, the battery pack 105 is employed as an energy source in applications such as transportation, telecom, household appliances, and the like. Although the illustrated embodiment depicts a single battery pack 105, it is to be understood that multiple battery packs may be used as per the requirement, without depicting from the scope of the present disclosure.

The battery pack 105 includes a plurality of cells 110 arranged therein. Each of the plurality of cells 110 is electrically coupled to the each other in one of a series connection, a parallel connection and a combination thereof. The battery pack 105 further includes multiple arrays (not shown) electrically coupled to each other. Each of the multiple arrays include the plurality of cells 110 electrically coupled to each other. Capacity of each of the plurality of cells 110 is dependent on one of user requirements, the application the battery pack 105 is used for, and a combination thereof.

In one embodiment, each of the plurality of cells 110 is one of, but not limited to, a Lithium ion (Li-ion), a Lead acid gel, and Nickel metal hydride. In an alternate embodiment, composition of each of the plurality of cells 110 is lithium or lithium polymer cells (referred to as "lithium") combined with a nickel hydrate battery cells. In alternate embodiments, any suitable battery cell composition may be used, including, but not necessarily limited to, lithium ion, zinc air, zinc oxide, super charged zinc oxide, and fuel cells.

Figure 4:
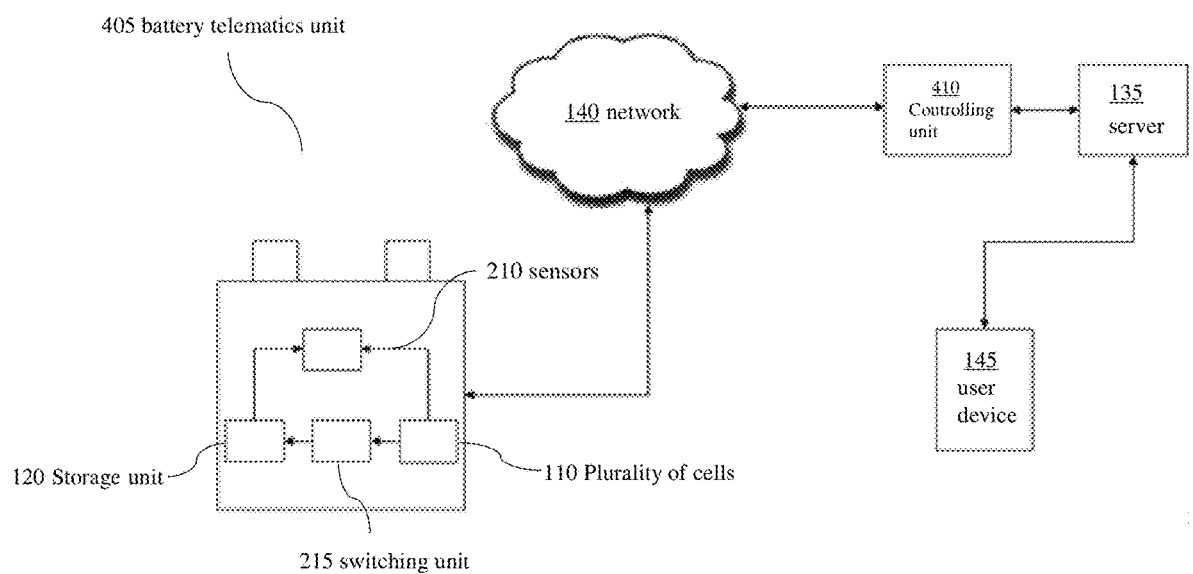
FIG. 4 is a bloc diagram of the battery pack of the FIG. 1 having a controlling unit located at a location remotely accessible by the user, in accordance with one or more embodiments of the present invention.

Each of the plurality of cells 110 is further electrically coupled to the system 115. In the illustrated and preferred embodiment, the system 115 is positioned within the battery pack 105. In alternate embodiments, the system 115 is located at a location remotely accessible to a user. The system 115 receives data pertaining to multiple operational parameters of each of the plurality of cells 110. The multiple operational parameters are one of, but not limited to, current, voltage, and temperature of each of the plurality of cells. In one embodiment, the battery pack 105 includes a battery telematics unit 405 (as shown in FIG. 4) receiving and temporarily storing the data pertaining to multiple operational parameters of each of the plurality of cells 110.

Based on the multiple operational parameters, the system 115 allows transfer of energy from at least one of the plurality of cells 110 to a storage unit 120. The storage unit 120 is electrically coupled to each of the plurality of cells 110 and is also communicably coupled to the system 115. In one embodiment, if the plurality of cells 110 are connected to each other in series connection, then number of storage units 120 is equivalent to the number of cells connected in series in the battery pack 110. In another embodiment, if the plurality of cells 110 are connected in parallel connection, then a single storage unit 120 is sufficient. The storage unit 120 is one of, but not limited to, a ultracapacitor, a pseudo capacitor, a supercapacitor, a Double Layer Capacitor (DLC), and a battery pack.

Subsequent to the transfer of energy, each of the plurality of cells 110 are at an ideal operating state and balancing of the plurality of cells 110 is achieved. The ideal operating state of each of the plurality of cells 110 is achieved when a voltage delta of each of the plurality of cells 110 is below a threshold value. Constructional and operational features of the system 115, and a method of balancing the plurality of cells 110 will be explained in detail with respect to the following figures.

The battery pack 105 is further electrically coupled to a load 125. As mentioned above, the battery pack 105 is used as the energy source in applications such as, but not limited to, transportation and telecom. Accordingly, if the battery pack 105 is employed in the transportation sector, the load 125 is multiple components of an electric vehicle. Similarly, if the battery pack is employed in the telecom sector, the load 125 is one of, but not limited to, a telecom tower. In addition, the battery pack 105 is configured to be removably coupled to a charging unit 130 for charging each of the plurality of cells 110 arranged within the battery pack 105.

The system 115 further transmits the data pertaining to the multiple operational parameters of the battery pack 105 to a server 135 via a network 140. In one embodiment, subsequent to transmission of the data related to the multiple parameters from the system 115 to the server 135, copy of the relevant data is automatically from the system 115. By doing so, ensures that the system 115 is not accumulated with previously stored data which is already transmitted to the server 135. Advantageously, the system 115 is not burdened with large volume of data beyond the capacity of the system 115, thereby ensuring that effective monitoring service is provided and improving the operational efficiency of the system 115. It may be understood that the server 135 may be implemented in a variety of computing systems, such as a mainframe computer, a network server, cloud, and the like.

The server 135 is in communication with the battery pack 105 via the network 140. In one embodiment, a Secure Hardware Extension (SHE) unit is embedded within the battery pack 105. The SHE unit ensures that a secure communication of data takes place between the system 115 and the server 135, thereby preventing third party access to data. In an embodiment, the network 140 can include wired and/or wireless connections such as, but not limited to, local area network (LAN), Bluetooth, Near Field Communication (NFC), infrared, WIFI, GPRS, LTE, Edge and the like.

In addition, the system 115 is in communication with a user device 145 via the network 140. As such, the user device 145 receives notifications pertaining to the multiple operational parameters of the battery pack 105 and the plurality of cells 110. In certain embodiments, the user device 145 enables the user to manually switch off the battery pack 105 from a remote location in case of an emergency. In addition, the user device 145 is communicably coupled to the server 135. Further, one of the server 135 and the system 115 is configured to provide the user with periodic reports regarding health of the battery pack 105. The user device 145 is one of, but not limited to, a mobile phone, a portable computer, a personal digital assistant, a handheld device, a laptop computer, and a display unit in the electric vehicle.

Figure 2:
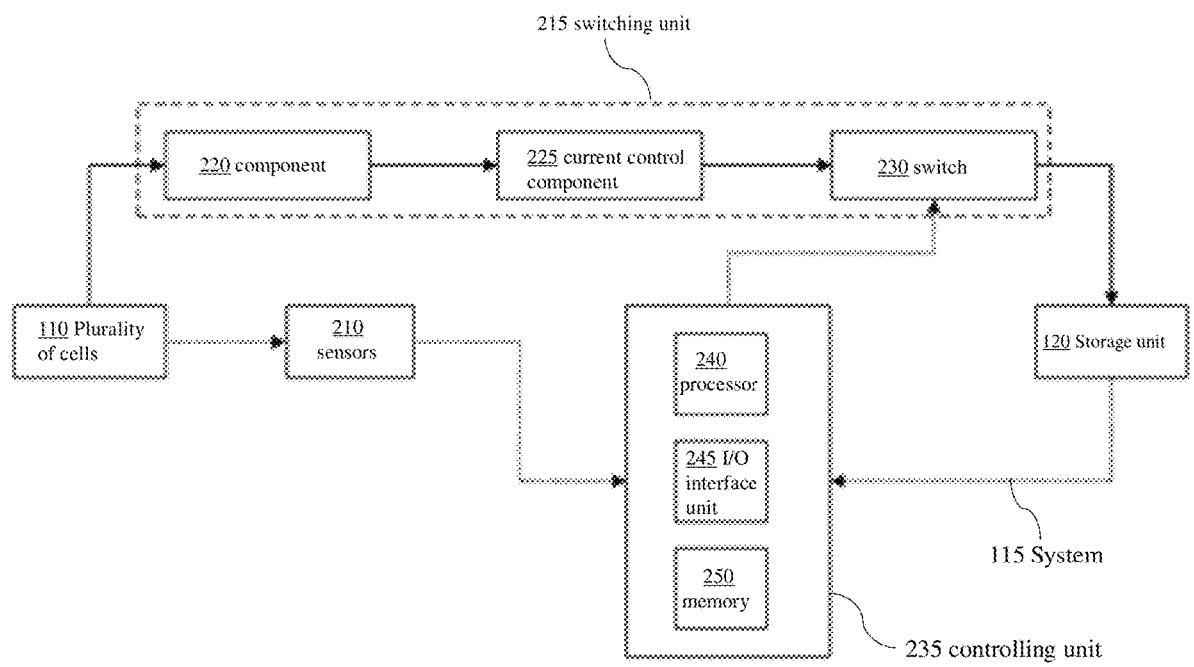
FIG. 2 is a schematic representation of the system of the FIG. 1 for balancing at least one of the plurality of cells, according to one or more embodiments of the present invention.

Referring to FIG. 2, FIG. 2 illustrates a schematic representation of the system 115 for balancing at least one of the plurality of cells 110, according to one or more embodiments of the present invention. The system 115 is coupled to each of the plurality of cells 110 arranged within the battery pack 105. The system 115 aids in transferring energy from at least one of the plurality of cells 110 to at least one of the storage unit 120.

As mentioned earlier, the battery pack 105 includes the plurality of cells 110. However, for the purpose of description, the system 115 is here forth explained with respect to "a single cell 110" for the embodiment as illustrated in the FIG. 2, and should nowhere be construed as limiting the scope of the present disclosure. Accordingly, the plurality of cells 110 is hereinafter referred to as "the cell 110".

The system 115 includes a plurality of sensors 210, hereinafter referred to as "the sensors 210". The sensors 210 are electrically coupled to the cell 110 to measure the multiple operational parameters of the cell 110. The sensors 210 are coupled one of wirelessly and by means of wire to the cell 110, depending on application of the sensor 210. The sensors 210 include, but is not limited to, a current sensor, a voltage sensor, an impedance sensor, and a temperature sensor. The multiple operational parameters correspond to, but is not limited to, current, voltage, temperature and State of Charge (SOC) of the cell 110.

The system 115 further includes a switching unit 215 electrically coupled to the cell 110. More specifically, an anode of the cell 110 is electrically coupled to a component 220 of the switching unit 215. The component 220 aids in maintaining one of a unidirectional and a controlled bi-directional flow of energy from the anode of the cell 110 to the component 220, and restricts flow in opposite direction. In one embodiment, the component 220 is a diode. In an alternate embodiment, the component 220 is a Metal Oxide Semiconductor Field Effect Transistor (MOSFET).

In the illustrated embodiment, the switching unit 215 includes a current control component 225 coupled to the component 220. The current control component 225 aids in providing protection to the system 115 from current surges. During transfer of energy from the cell 110 to the storage unit 120 a potential difference arises. In certain cases, the storage unit 120 may be subjected to damages such as short circuit and the like. In such cases the current control component 220, advantageously, protects the cell 110 and in turn the battery pack 105 from damages. In one embodiment, the current control component 225 is one of, but not limited to, a Field Effect Transistor (FET). In another embodiment, the system 115 is provided independent of the current control component 225.

The switching unit 215 further includes a switch 230. The switch 230 is configured to one of allow and prevent transfer of energy from the cell 110 to the storage unit 120. The switch 230 is one of, but not limited to, a electromechanical switch, a manual switch, a toggle switch, a Metal Oxide Semiconductor Field Effect Transistor (MOSFET), an Insulated Gate Bipolar Transistor (IGBT), and a Junction Field Effect Transistor (JFET).

The switching unit 215, including the component 220, the current control component 225, and the switch 230, is thereafter coupled to the storage unit 120. Thus, the cell 110 is electrically coupled to the at least one storage unit 120 via the switching unit 215. The storage unit 120 is one of, but not limited to, a ultracapacitor, a pseudo capacitor, a super-capacitor, a Double Layer Capacitor (DLC), and a battery pack.

The system 115 further includes a controlling unit 235. The controlling unit 235 may include at least one processor 240, an input/output (I/O) interface unit 245, and a memory 250. The at least one processor 240 may be implemented as one or more microprocessors, microcomputers, microcontrollers, digital signal processors, central processing units, state machines, logic circuitries, and/or any devices that manipulate signals based on operational instructions. Among other capabilities, the at least one processor 240 is configured to fetch and execute computer-readable instructions stored in the memory 250.

The I/O interface unit 245 may include a variety of software and hardware interfaces, for example, a web interface, a graphical user interface, Light Emitting Diode (LED) and the like. The I/O interface unit 245 may allow the user to interact with the controlling unit 235 directly or through the user device 145. Further, the I/O interface unit 245 may enable the controlling unit 235 to communicate with other computing devices, such as the server 135 and external data servers (not shown). The I/O interface 245 may facilitate multiple communications within a wide variety of networks and protocol types, including wired networks, for example, LAN, cable, etc., and wireless networks, such as WLAN, cellular, or satellite. In one embodiment, The I/O interface unit 245 may include one or more ports for connecting a number of devices to one another or to another server.

The memory 250 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

The controlling unit 235 is communicably coupled to the sensors 210 to receive data pertaining to the multiple operational parameters of the cell 110. The controlling unit 235 is further communicably coupled to the switching unit 215. More specifically, the controlling unit 235 is one of electrically and communicably coupled to the switch 230 of the switching unit 215. The controlling unit 235 is configured to selectively operate the switch 230 to allow the transfer of energy from the cell 110 to the storage unit 120. Working and operation of the controlling unit 235 to balance the cell 110 will be explained in more detail with respect to FIG. 3.

Figure 3:
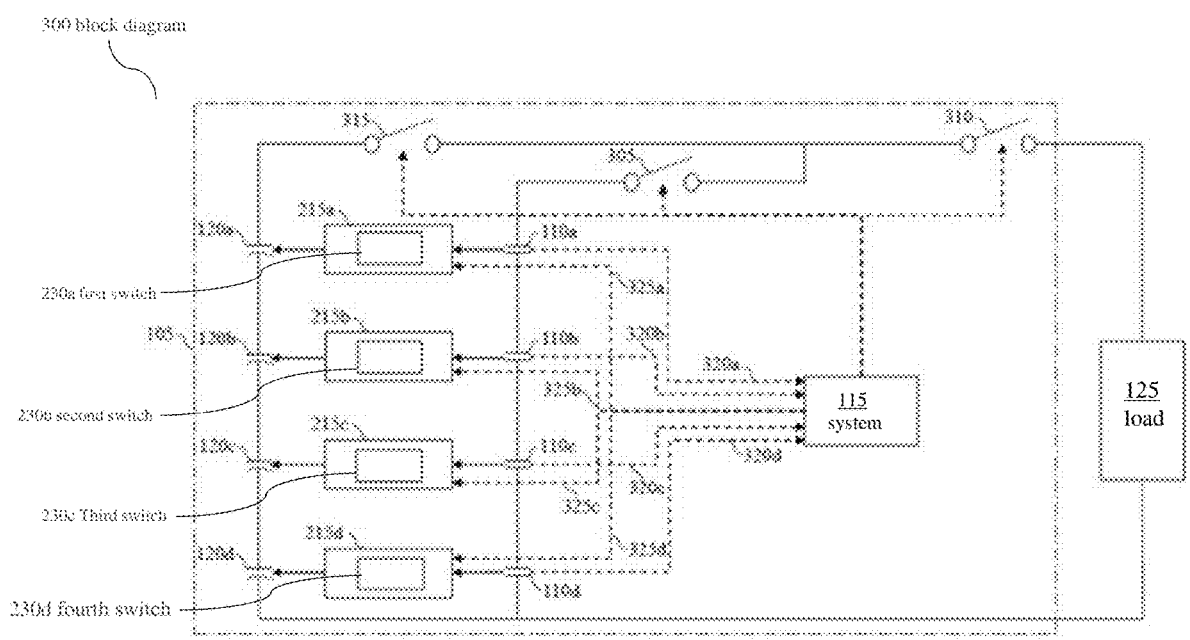
FIG. 3 is a block diagram of the battery pack of the FIG. 1 including the system to balance the plurality of cells of FIG. 1, in accordance with one or more embodiments of the present invention.

Referring to FIG. 3, FIG. 3 illustrates a block diagram 300 of the battery pack 105 including the system 115 to balance the plurality of cells 110, in accordance with one or more embodiments of the present invention. As mentioned earlier, the battery pack 105 includes the plurality of cells 110. Each of the plurality of cells 110 are electrically coupled to each other in one of the series connection, the parallel connection and combination thereof.

For the purpose of description and explanation, the plurality of cells 110 are here forth explained with respect to a first cell 110a, a second cell 110b, a third cell 110c, and a fourth cell 110d. It is however to be understood that the plurality of cells 110 may include additional number of cells than the first cell 110a, the second cell 110b, the third cell 110c, and the fourth cell 110d as per requirement of the application, and should nowhere be construed as limiting the scope of the present disclosure.

As per the illustrated embodiment, each of the first, the second, the third, and the fourth cell 110a-d are coupled to each other in series connection. In alternate embodiments, each of the first, the second, the third, and the fourth cell 110a-d may be coupled to each other in one of parallel connection and combination of series connection and parallel connection.

As each of the first, the second, the third, and the fourth cell 110a-d is connected to each other in series connection, the battery pack 105 includes a first storage unit 120a, a second storage unit 120b, a third storage unit 120c, and a fourth storage unit 120d also connected to each other in series. In the illustrated embodiment, each of the first, the second, the third, the fourth storage unit 120a-d is a supercapacitor. In alternative embodiments, each of the first, the second, the third, the fourth storage unit 120a-d is the ultracapacitor, the pseudo capacitor, the Double Layer Capacitor (DLC), and the battery pack.

Further, the cell 110 is electrically coupled to the at least one storage unit 120 via the switching unit 215, as mentioned earlier in FIG. 2. Accordingly, the battery pack 105 includes a first switching unit 215a, a second switching unit 215b, a third switching unit 215c, and a fourth switching unit 215d.

With reference to the illustrated embodiment in FIG. 3, the first cell 110a is electrically coupled to the first storage unit 120a via the first switching unit 215a, the second cell 110b is electrically coupled to the second storage unit 120b via the second switching unit 215b, the third cell 110c is electrically coupled to the third storage unit 120c via the third switching unit 215c, and the fourth cell 110d is electrically coupled to the fourth storage unit 120d via the fourth switching unit 215d.

The battery pack 105 further includes the plurality of sensors 210 (as shown in FIG. 2) communicably coupled to each of the first cell 110a, the second cell 110b, the third cell 110c, and the fourth cell 110d via a first communication line 320a, a second communication line 320b, a third communication line 320c, and a fourth communication line 320d. The plurality of sensors 210 are configured to measure the multiple operational parameters of each of the first, the second, the third, and the fourth cell 110a-d. The measured multiple operational parameters are thereafter transmitted to the controlling unit 235 of the battery pack 105 via the first, the second, the third, and the fourth communication line 320a-d. In the illustrated embodiment, the controlling unit 235 is located within the battery pack 105. In alternative embodiments, the controlling unit 235 may be located at a location remotely accessible by the user.

On receiving the multiple operational parameters, the controlling unit 235 determines an energy value ($E_{(cell-n)}$) of each of the first, the second, the third, and the fourth cell 110a-d. The energy value ($E_{(cell-n)}$) of each of the first, the second, the third, and the fourth cell 110a-d is defined as energy stored therein with respect to a capacity of each of the first, the second, the third, and the fourth cell 110a-d at a given point of time.

The energy value ($E_{(cell-n)}$) of each of the first, the second, the third, and the fourth cell 110a-d is equivalent to a ratio of a product of a nominal voltage, SOC and the capacity of each of the first, the second, the third, and the fourth cell 110a-d to hundred.

$$\text{Energy value } (E_{(cell-n)}) = \{(\text{Nominal Voltage}_{(cell-n)})^* \\ (SOC_{(cell-n)})^*(\text{Capacity}_{(cell-n)})\}/100 \quad (\text{Eq. 1})$$

In one embodiment, the controlling unit 235 determines the energy value ($E_{(cell-n)}$) at pre-set intervals, as defined by the user. In an alternative embodiment, the controlling unit 235 determines the energy value ($E_{(cell-n)}$) is continuously determining and monitoring the energy value ($E_{(cell-n)}$) of each of the first, the second, the third, and the fourth cell 110a-d. In one embodiment, the controlling unit 235 determines the voltage and current of each of the first, the second, the third, and the fourth cell 110a-d based on the measured operational parameters. Thereafter, the controlling unit 235 determines the energy value ($E_{(cell-n)}$) of each of the first, the second, the third, and the fourth cell 110a-d by mapping the determined voltage value with a respective energy value as per an energy look up table, as provided for the battery pack 105. In an alternative embodiment, the controlling unit 235 determines the energy value ($E_{(cell-n)}$) of each of the first, the second, the third, and the fourth cell 110a-d based on a coulomb count of each of the energy value ($E_{(cell-n)}$) of each of the first, the second, the third, and the fourth cell 110a-d.

Subsequently, the controlling unit 235 compares the determined energy value ($E_{(cell-n)}$) of each of the first, the second, the third, and the fourth cell 110a-d with each other to select a minimal energy value ($E_{(cell-min)}$). The minimal energy value ($E_{(cell-min)}$) is the least energy value of at least one of the first, the second, the third, and the fourth cell 110a-d.

The controlling unit 235, further, determines an energy delta ($D_n$) for each of the first, the second, the third, and the fourth cell 110a, 110b, 110c, and 110d. The energy delta of each of the first, the second, the third, and the fourth cell 110a-d is a difference between the energy value ($E_{(cell-n)}$) of each of the first, the second, the third, and the fourth cell 110a-d and the minimal energy value ($E_{(cell-min)}$) of at least one of the first, the second, the third, and the fourth cell 110a-d.

$$\text{Energy Delta}(Dn) = E_{(cell-n)} - E_{(cell-min)} \quad (\text{Eq. 2})$$

On calculation of the energy delta ($D_n$) of each of the first, the second, the third, and the fourth cell 110a, 110b, 110c, and 110d, the controlling unit 235 determines excess energy available in at least one of the first, the second, the third, and the fourth cell 110a, 110b, 110c, and 110d. The excess energy in the at least one of the first, the second, the third, and the fourth cell 110a, 110b, 110c, and 110d is to be transferred to one of the first, the second, the third, and the fourth storage unit 120a-d to balance the cells. Thereby, advantageously, reducing wastage of energy in form of heat.

Subsequently, the controlling unit 235 determines a voltage set point ($VS_{(cap-n)}$) for each of the first, the second, the third, and the fourth storage unit 120a-d on the basis of the energy to be transferred from at least one of the first, the second, the third, and the fourth cell 110a, 110b, 110c, and 110d to the first, the second, the third, and the fourth storage unit 120a-d, respectively. The voltage set point ($VS_{(cap-n)}$) is the projected voltage level of each of the first, the second, the third, and the fourth storage unit 120a-d subsequent to receiving the energy from at least one of the first, the second, the third, and the fourth cell 110a, 110b, 110c, and 110d, respectively. The voltage set point ($VS_{(cap-n)}$) for each of the first, the second, the third, and the fourth storage unit 120a-d is a square root of a ratio of two times the energy value ($E_{(cell-n)}$) of each of the first, the second, the third, and the fourth cell 110a-d to a capacitance of each of the first, the second, the third, and the fourth storage unit 120a-d.

$$\text{Voltage Set Point } (VS_{(cap-n)}) = \text{Sqrt}\{(2^*\text{Energy value} \\ (E_{(cell-n)})/\text{Capacitance } (C_{(cap-n)})\} \quad (\text{Eq. 3})$$

The controlling unit 235 further determines a time period ($t_n$) for operating the switching unit 215. More specifically, the controlling unit 235 determines the time period ($t_n$) for operating a first, a second, a third, and a fourth switch 230a-d provided in each of the first, the second, the third and the fourth switching unit 215a-d, respectively. The controlling unit 235 determines the time period ($t_n$) for operating each of the first, the second, the third, and the fourth switch 230a-d based on the energy delta ($D_n$) of each of the first, the second, the third, and the fourth cell 110a, 110b, 110c, and 110d, respectively. More specifically, the controlling unit 235 determines the time period ($t_n$) by determining time required to charge at least one of the first, the second, the third, and the fourth storage unit 120a-d. Accordingly, the time period ($t_n$) is defined as a ratio of a product of the capacitance and voltage set point ($VS^{(cap-n)}$) for each of the first, the second, the third, and the fourth storage unit 120a-d, respectively to the charging current.

$$\text{Time period } (t_n) = \{\text{Capacitance } (C_{(cap-n)})^*\text{Voltage Set} \\ \text{Point } (VS_{(cap-n)})\}/\text{Charging Current} \quad (\text{Eq. 4})$$

The charging current is a predefined value based on, but not limited to, the capacitance of the battery pack 105, PCB thickness, ratings of the switching unit 215.

In one embodiment, the controlling unit 235 further, determines one of an equivalent resistance and an ON-state resistance of each of the first, the second, the third, and the fourth switch 230a-d based on the energy delta ($D_n$) of each of the first, the second, the third, and the fourth cell 110a, 110b, 110c, and 110d, respectively The controlling unit 235 communicates with each of the first, the second, the third, and the fourth switch 230a-d via a first communication line 325a, a second communication line 325b, a third communication line 325c, and a fourth communication line 325d. Accordingly, the controlling unit 235 selectively operates each of the first, the second, the third, and the fourth switch 230a-d for the determined time period ($t_n$). In one embodiment, the controlling unit 235 selectively operates each of the first, the second, the third, and the fourth switch 230a-d for the determined time period ($t_n$) based on one of, but not limited to, the equivalent resistance and the ON-state resistance of each of the first, the second, the third, and the fourth switch 230a-d, the voltage set point ($VS_{(cap-n)}$) of each of the first, the second, the third, and the fourth storage unit 120a-d, and a combination thereof.

Accordingly, the excess energy from at least one of the first, the second, the third, and the fourth cell 110a, 110b, 110c, and 110d is transferred to the first, the second, the third, the fourth storage unit 120a, 120b, 120c, and 120d, respectively. The energy transferred from at least one of the first, the second, the third, and the fourth cell 110a, 110b, 110c, and 110d is based on the energy delta of each of the first, the second, the third, and the fourth cell 110a, 110b, 110c, and 110d.

Subsequent to transfer of the energy, state of each of the first, the second, the third, and the fourth cell 110a, 110b, 110c, and 110d is at the ideal operating state, and each of the first, the second, the third, and the fourth cell 110a, 110b, 110c, and 110d is considered to be balanced.

In another embodiment, the controlling unit 235 selectively operates each of the each of the first, the second, the third, and the fourth switch 230a-d based on the voltage delta of each of the first, the second, the third, and the fourth cell 110a, 110b, 110c, and 110d.

Accordingly, the ideal operating state of each of the first, the second, the third, and the fourth cell 110a, 110b, 110c, and 110d is achieved when a voltage delta ($VD_n$) of each of the first, the second, the third, and the fourth cell 110a, 110b, 110c, and 110d is lesser than a threshold value. The voltage delta ($VD_n$) is defined as a difference between a voltage value ($V_{(cell-n)}$) of each of the first, the second, the third, and the fourth cell 110a, 110b, 110c, and 110d and a minimal voltage value ($V_{(cell-min)}$) of at least one of the first, the second, the third, and the fourth cell 110a, 110b, 110c, and 110d.

Voltage Delta(VDn)=$V$(cell-n)-$V$(cell-min)  (Eq. 2)

The threshold value pertains to a voltage range determined based on the type and composition of each of the first, the second, the third, and the fourth cell 110a, 110b, 110c, and 110d.

Further, the excess energy transferred from at least one of the first, the second, the third, and the fourth cell 110a, 110b, 110c, and 110d to the first, the second, the third, the fourth storage unit 120a, 120b, 120c, and 120d, respectively is advantageously utilized to one of recharge the at least one of the first, the second, the third, and the fourth cell 110a, 110b, 110c, and 110d, provide energy to the load 125 and a combination thereof. In addition, the excess energy available in at least one of the first, the second, the third, and the fourth cell 110a, 110b, 110c, and 110d is reutilized and not wasted in the form of heat and the like. As such, the system 115 ensures optimum utilization of the energy available in the battery pack 105 and further ensures efficient utilization of the battery pack 105.

In this regard, the battery pack 105 includes a cell-load switch 305, a DC connection switch 310, and a storage unit switch 315. Each of the cell-load switch 305, the DC connection switch 310, and the storage unit switch 315 are communicably coupled to the controlling unit 235. On actuation of the cell-load switch 305 and the storage unit switch 315, at least one of the first, the second, the third, and the fourth cell 110a, 110b, 110c, and 110d is charged via the first, the second, the third, the fourth storage unit 120a, 120b, 120c, and 120d. Further, on actuation of the cell-load switch 305 and the DC connection switch 310, each of the first, the second, the third, and the fourth cell 110a-d one of discharges to provide energy to the load 125 and is charged by the charging unit 130. Furthermore, on actuation of the DC connection switch 310 and the storage unit switch 315, the energy stored in each of the first, the second, the third, the fourth storage unit 120a, 120b, 120c, and 120d is used to provide energy to the load 125.

FIG. 4 illustrates an exemplary embodiment in which a controlling unit 410 of the system 405 of the battery pack 105 is located at the location remotely accessible by the user, according to one or more embodiments of the present invention. As mentioned earlier, the battery pack 105 includes the plurality of cells 110, the switching unit 215 coupled to the plurality of cells 110, the storage unit 120, and the plurality of sensors 210 coupled to the plurality of cells 110 and the storage unit 120. The operation and arrangement of the battery pack 105 with respect to the plurality of cells 110, the switching unit 215, the storage unit 120, and the plurality of sensors 210 is similar to as illustrated and described with in respect to FIG. 2 and FIG. 3. Therefore, for the sake of brevity the same will not be described again in the description for FIG. 4.

The battery pack 105 further communicates with the controlling unit 410 located at the remote location via the network 140. The plurality of sensors 210 transfers the data pertaining to the multiple operational parameters of the plurality of cells 110 via the network 140. Based on the multiple operational parameters, the controlling unit 410 determines the energy value ($E_{(cell-n)}$) of each of the plurality of cells 110, the energy delta ($D_n$), the voltage set point ($VS_{(cap-n)}$) of each of the at least one storage unit 120, the time period ($t_n$), and the voltage value ($V_{(cell-n)}$) of each of the plurality of cells 110 based on the respective equations as provided. Thereafter, the controlling unit 410 allows transfer of energy from at least one of the plurality of cells 110 to the at least one storage unit 120.

The controlling unit 410, of the illustrated embodiment, is further configured to provide real time information with respect to the energy value ($E_{(cell-n)}$) of each of the plurality of cells 110, the energy delta ($D_n$), the voltage set point ($VS_{(cap-n)}$) of each of the at least one storage unit 120, the time period ($t_n$) for balancing, and the voltage value ($V_{(cell-n)}$) to the user. Accordingly, the controlling unit 410 communicates with the user device 145 of the user via the server 135. In one embodiment, the controlling unit 410 provides the user with the real time information in the form of illustrative graphs as shown in FIGS. 4A-F. In another embodiment, the controlling unit 410 notifies the user on the user device 145 by pop up messages and the like, and thereby alert the user of imbalanced cells. In yet another embodiment, the user is enabled to manually trigger the balancing of the at least one plurality of cells 110 via the controlling unit 410. As such, the battery pack 105 is continuously monitored by the user.

Various embodiments disclosed herein are to be taken in the illustrative and explanatory sense and should in no way be construed as limiting of the present disclosure.

INDUSTRIAL APPLICABILITY

The present disclosure provides the system 115 for balancing the plurality of cells 110 arranged within the battery pack 105. The system 115 enables balancing of the plurality of cells 110 during one of charging the battery pack 105 and in real time during operation of the battery pack 105. The battery pack 105 includes the plurality of cells 110 and at least one storage unit 120 disposed therein. The battery pack 105 further includes the system 115 for balancing the plurality of cells 110. The system 115 includes the controlling unit 235 to efficiently control the switching unit 215 to aid in transfer of excess energy from the plurality of cells 110 to the storage unit 120.

The controlling unit 235 in communication with the switching unit 215 aids in transfer of excess energy in real time, and as such ensures continuous operation of the battery pack 105. The energy thus transferred is utilized to one of recharge the at least one of the plurality of cells 110, provide energy to the load 125, and combination thereof. As such, the system 115 advantageously ensures minimum wastage of the excess energy as heat, and ensures efficient operation of the battery pack 105. As the excess energy is reutilized by the battery pack without dissipation of excess heat, the battery pack 100 does not require any additional components to compensate for excess heat. Further, as the system 115 does not utilize hardware components, such as fly back convertors, susceptible to Electro Magnetic Interference (EMI) and Electro Magnetic Compatibility (EMC), the system 100 need not include additional hardware to ensure robustness of the battery pack 105, and thereby ensuring compactness of the battery pack 100.

FIG. 5 is a flow chart of a method 500 of balancing the plurality of cells 110 arranged within a battery pack 105, according to one or more embodiments of the present invention. For the purpose of description and explanation, the method 500 is described with respect to the embodiment as illustrated in FIG. 3.

At step 502, the controlling unit 235 of the system 115 determines the energy value ($E_{(cell-n)}$) for each of the plurality of cells 110.

With reference to the embodiment illustrated in FIG. 3, the battery pack 105 includes the plurality of sensors 210 to measure the multiple operational parameters of each of the first, the second, the third, and the fourth cell 110a-d. The plurality of sensors 210 further transmits the data pertaining to the multiple operational parameters to the controlling unit 235 via the first communication line 320a, the second communication line 320b, the third communication line 320c, and the fourth communication line 320d. The controlling unit 235 determines the energy value of each of the first, the second, the third, and the fourth cell 110a, 110b, 110c, and 110d with respect to the capacity of each of the first, the second, the third, and the fourth cell 110a, 110b, 110c, and 110d at the given point of time.

The energy value ($E_{(cell-n)}$) of each of the first, the second, the third, and the fourth cell 110a-d is equivalent to a ratio of a product of a nominal voltage, SOC and the capacity of each of the first, the second, the third, and the fourth cell 110a-d to hundred. Accordingly, as per Eq. 1, the controlling unit 235 determines the energy value ($E_{(cell-n)}$) of each of the first, the second, the third, and the fourth cell 110a-d. Thus, the energy value ($E_{(cell-1)}$) of the first cell 110a is 2448 J, the energy value ($E_{(cell-2)}$) of the second cell 110b is 2880 J, the energy value ($E_{(cell-3)}$) of each of the third cell 110c is 2592 J, and the energy value ($E_{(cell-4)}$) of the fourth cell 110d is 2749 J.

Figure 4A:
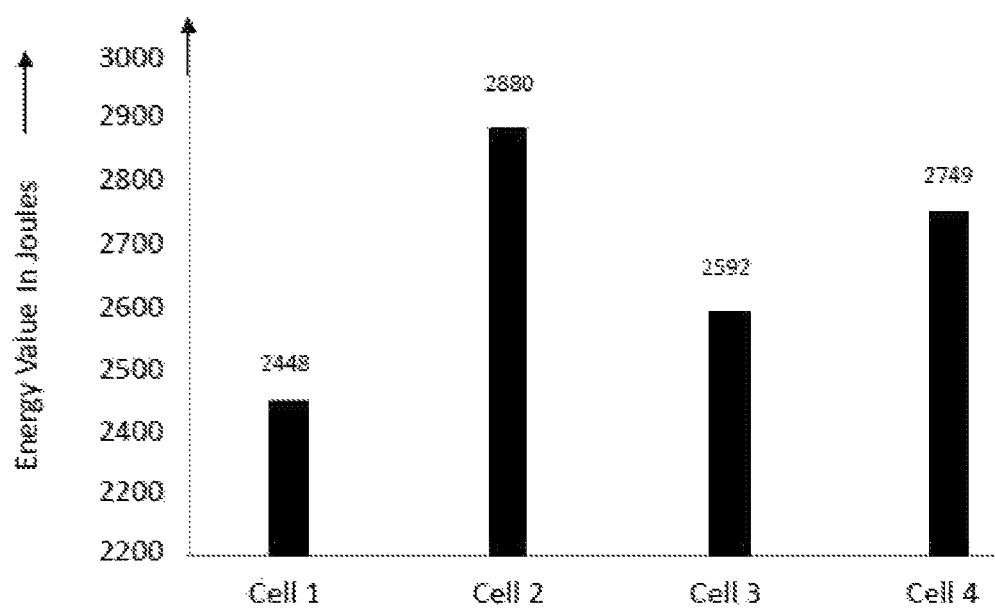
FIG. 4A is a graphical representation of energy value ($E_{(cell-n)}$) in each cells of the battery pack of the FIG. 1, in accordance with one or more embodiments of the present invention.

With reference to the graphical illustration as illustrated in FIG. 4A, the energy value ($E_{(cell-n)}$) is depicted along the Y-axis and each of the first, the second, the third, and the fourth cell 110a-d is depicted along the X-axis. It is evident from the graphical representation of FIG. 4A that the energy values ($E_{(cell-n)}$) of the first, the second, the third, and the fourth cell 110a, 110b, 110c, and 110d are different, and hence the controlling unit 235 determines that the battery pack 105 is imbalanced. On determination of the energy value ($E_{(cell-n)}$), the controlling unit 235 stores the same in the memory 250 of the controlling unit 235. In one embodiment, the controlling unit 235 further transfers the energy value ($E_{(cell-n)}$) of each of the first, the second, the third, and the fourth cell 110a-d to the server 135, and thereby improves the computational efficiency of the controlling unit 235.

Further, the controlling unit 235 compares the energy value ($E_{(cell-1-4)}$) of each of the first, the second, the third, and the fourth cell 110a-d with each other to determine the minimal energy value ($E_{(cell-min)}$) to select the minimal energy value. The controlling unit 235 compares the energy value of the first cell 110a ($E_{(cell-1)}$), the energy value of the second cell 110b ($E_{(cell-2)}$), the energy value of the third cell 110c ($E_{(cell-3)}$), and the energy value of the fourth cell 110d ($E_{(cell-4)}$) with each other. It is evident from the graphical representation shown in FIG. 4A, the energy value of the first cell 110a, ($E_{(cell-1)}$), is the least in comparison to the energy value of the second cell 110b ($E_{(cell-2)}$), the energy value of the third cell 110c ($E_{(cell-3)}$), and the energy value of the fourth cell 110d ($E_{(cell-4)}$). Hence, the controlling unit 235 selects the energy value of the first cell 110a ($E_{(cell-1)}$) as the minimal energy value ($E_{(cell-min)}$).

Figure 4B:
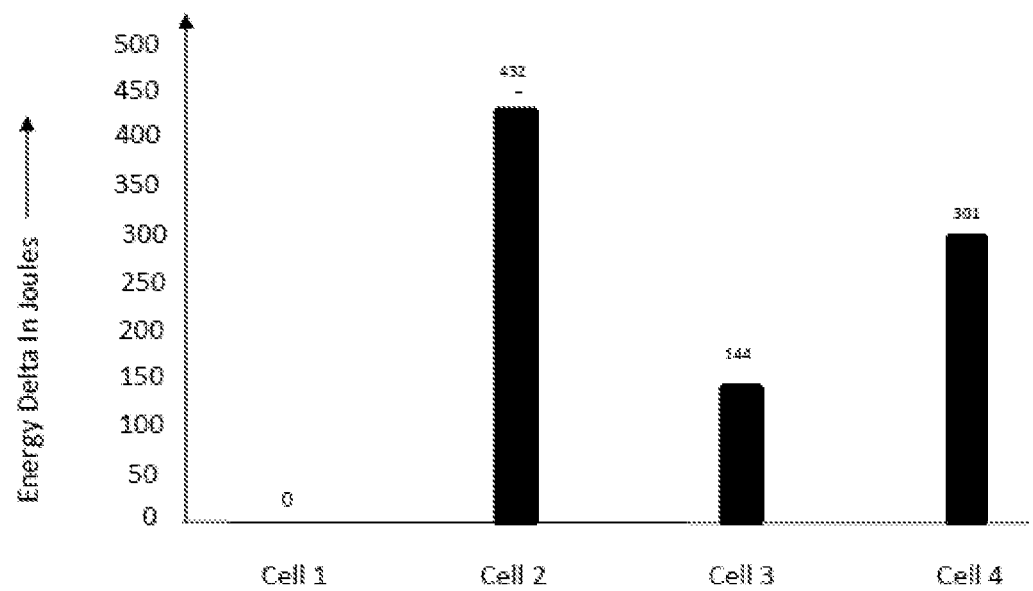
FIG. 4B is a graphical representation of energy delta ($D_n$) of each cells of the battery pack of the FIG. 1, in accordance with one or more embodiments of the present invention.

At step 504, based on the determined energy value the method 500 determines the energy delta ($D_n$) for each of the plurality of cells 110. The energy delta ($D_n$) of each of the plurality of cells 110 is a difference between the energy value ($E_{(cell-n)}$) of each of the plurality of cells 110 and the minimal energy value ($E_{(cell-min)}$) of at least one of the plurality of cells 110. FIG. 4B illustrates a graphical representation depicting energy delta ($D_n$) along the Y-axis and each of the first, the second, the third, and the fourth cell 110a-d along the X-axis.

As mentioned earlier, the energy value for the first cell 110a ($E_{(cell-1)}$) is 2448 J, and the minimal energy value ($E_{(cell-min)}$) is also 2448 J. Accordingly, as per the Eq. 2, the energy delta for the first cell 110a, $D_1$=0J, as shown in FIG. 4B.

Further, the energy value for the second cell 110b ($E_{(cell-2)}$) is 2880 J and the minimal energy value ($E_{(cell-min)}$) is 2448 J. Accordingly, as per the Eq. 2, the energy delta for the second cell 110b, $D_2$=432 J, as shown in FIG. 4B.

Further, the energy value for the third cell 110c ($E_{(cell-3)}$) is 2592 J and the minimal energy value ($E_{(cell-min)}$) is 2448 J. Accordingly, as per the Eq. 2, the energy delta for the third cell 110c, $D_3$=144 J, as shown in FIG. 4B.

Furthermore, the energy value for the fourth cell 110d ($E_{(cell-4)}$) is 2749J and the minimal energy value ($E_{(cell-min)}$) is 2448 J. Accordingly, as per the Eq. 2, the energy delta for the fourth cell 110d, $D_4$=301 J.

Simply said, the first cell 110a has the minimal available energy and hence no excess energy is to be transferred to the first storage unit 120a. The second cell 110b has 432 J of excess energy required to be transferred to the second storage unit 120b. Likewise, the third cell 110c has 144 J of excess energy required to be transferred to the third storage unit 120c, and the fourth cell 110d has 301 J of excess energy to be transferred to the fourth storage unit 120d.

Figure 4C:
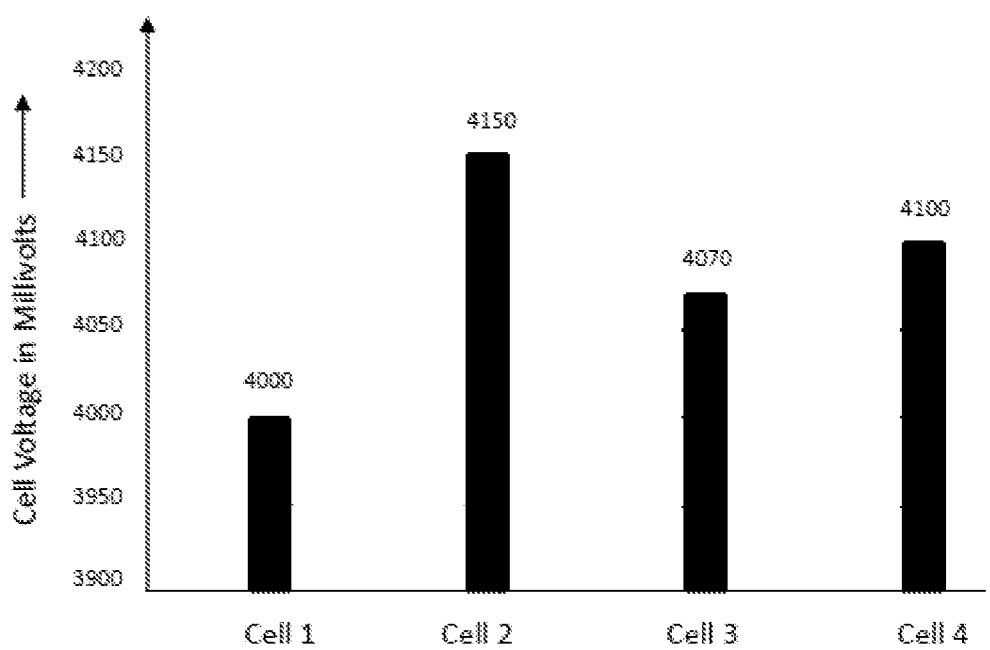
FIG. 4C is a graphical representation of voltage of each cells of the battery pack of the FIG. 1 prior to balancing of each of the cells, in accordance with one or more embodiments of the present invention.

Based on the multiple operational parameters, the controlling unit 235 further determines voltage ($V_n$) of each of the first, the second, the third, and the fourth cell 110a-d, as illustrated in the FIG. 4C. The FIG. 4C depicts voltage along the y-axis and each of the first, the second, the third, and the fourth cell 110a-d along the x-axis. As per the graph, the voltage of the first cell 110a, V1 is equivalent to 4000V, the voltage of the second cell 110b, $V_2$ is equivalent to 4150V, the voltage of the third cell 110c, $V_3$ is equivalent to 4070V, and the voltage of the fourth cell 110d, $V_4$ is equivalent to 4100V.

Thereafter, the controlling unit 235 determines the voltage set point ($VS_{(cap-n)}$) for each of the first, the second, the third, and the fourth storage unit 120a-d on the basis of the energy to be transferred. The voltage set point ($VS_{(cap-n)}$) for each of the first, the second, the third, and the fourth storage unit 120a-d is a square root of a ratio of the energy value ($E_{(cell-n)}$) of each of the first, the second, the third, and the fourth cell 110a-d to a capacitance of each of the first, the second, the third, and the fourth storage unit 120a-d. Further, as per FIG. 4D, the voltage set point ($VS_{(cap-n)}$) is depicted along the Y-axis and each of the first, the second, the third, and the fourth storage unit 120a-d along the X-axis.

Figure 4D:
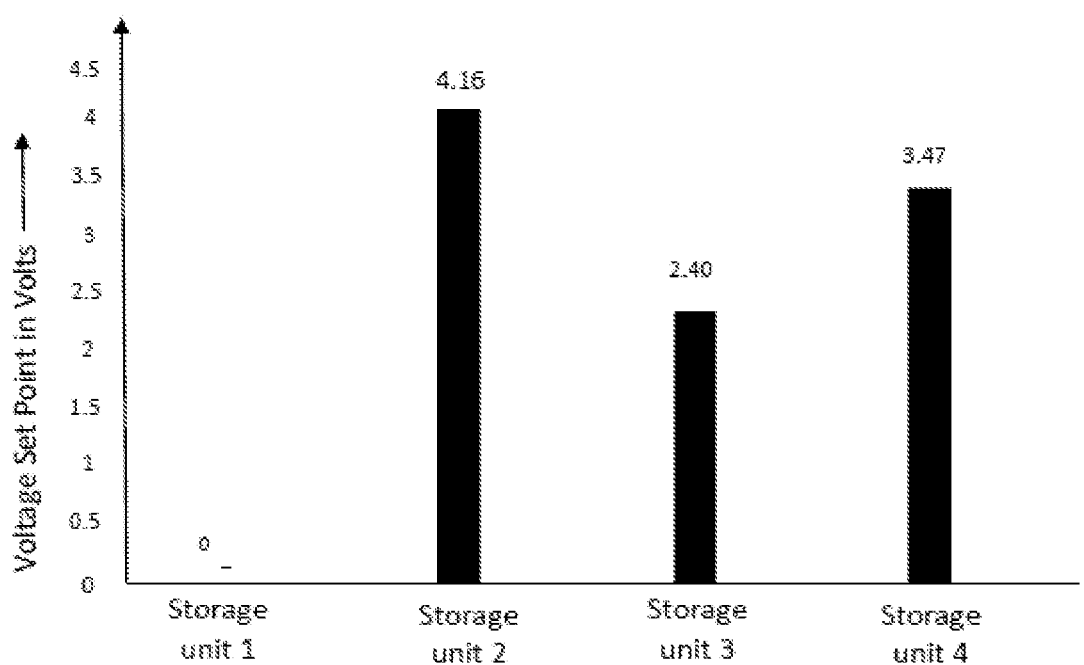
FIG. 4D is a graphical representation of voltage set point ($VS_{(cap-n)}$) of each storage unit of the battery pack of the FIG. 1, in accordance with one or more embodiments of the present invention.

As per the Eq. 3, the voltage set point for the first storage unit 120a, $VS_{(cap-1)}$=0V, as shown in FIG. 4D. Likewise, as per the Eq. 3, the voltage set point for the second storage unit 120b, $VS_{(cap-2)}$=4.16V, the voltage set point for the third storage unit 120c, $VS_{(cap-3)}$=2.40V, and the voltage set point for the fourth storage unit 120d, $VS_{(cap-4)}$=3.47V, as shown in FIG. 4D.

At step 506, the method 500 includes the step of determining the time period to operate the switching unit 215 based on the energy delta ($D_n$) of each of the plurality of cells 110. Referring to FIG. 3, the controlling unit 235 determines the time period (t) for operating each of the first, the second, the third, and the fourth switch 230a-d based on the energy delta ($D_n$) of each of the first, the second, the third, and the fourth cell 110a, 110b, 110c, and 110d, respectively. More specifically, the controlling unit 235 determines the time period ($t_n$) by determining time required to charge at least one of the first, the second, the third, and the fourth storage unit 120a-d. The time period ($t_n$) is defined as the ratio of the product of the capacitance and voltage set point ($VS_{(cap-n)}$) for each of the first, the second, the third, and the fourth storage unit 120a-d, respectively to the charging current. Further, as per FIG. 4E, the time period ($t_n$) is depicted along the Y-axis and each of the first, the second, the third, and the fourth switch 230a-d along the X-axis.

Figure 4E:
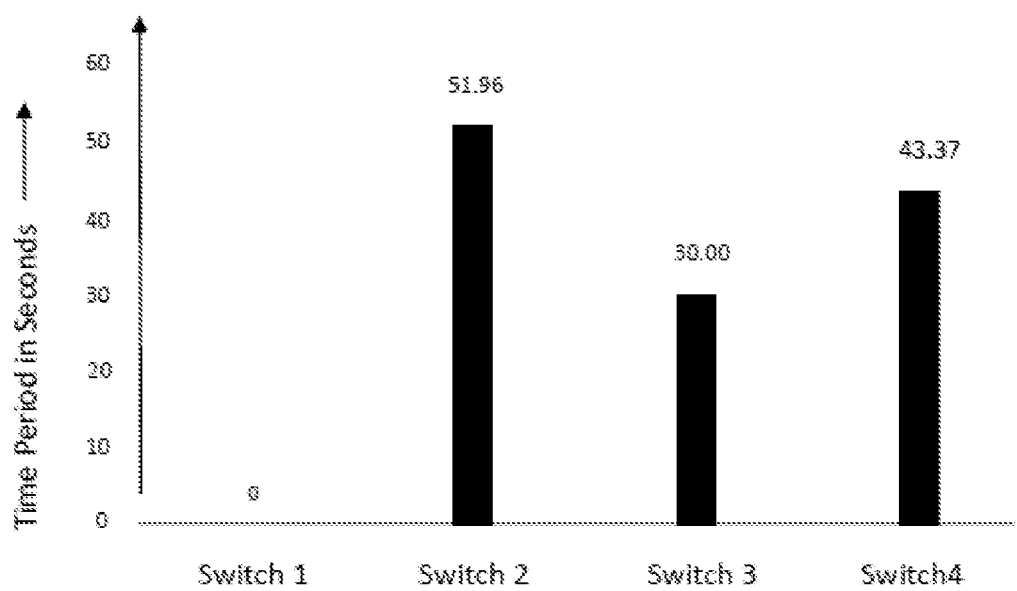
FIG. 4E is a graphical representation of a time period determined for balancing each cells of the battery pack of the FIG. 1, in accordance with one or more embodiments of the present invention.

The controlling unit 235 determines the time period (t2) for operating the second switch 230b to transfer 432 J of energy from the second cell 110b to the second storage unit 120b. As per Eq. 4, time period (t2)=51.96 seconds, as shown in FIG. 4E.

Likewise, the controlling unit 235 determines the time period (t3) and the time period (t4) to transfer 144 J and 301 J of energy from each of the third cell 110c and the fourth cell 110d to the third and the fourth storage unit 120c, 120d, respectively. As per Eq. 4, time period (t3)=30 seconds and time period (t4)=43.37 seconds, as shown in FIG. 4E. As the energy delta for the first cell 110a, $D_1$=0 J, the controlling unit 235 need not operate the first switch 230a, and as such need not calculated time period (t1).

In one embodiment, the controlling unit 235 further, determines one of an equivalent resistance and an ON-state resistance of each of the first, the second, the third, and the fourth switch 230a-d based on the energy delta ($D_n$) of each of the first, the second, the third, and the fourth cell 110a, 110b, 110c, and 110d, respectively.

At step 508, the method 500 includes the step of selectively operating the switching unit 215 for the time period (t) to allow transfer of the energy from at least one of the plurality of cells 110 to a storage unit 120. On transfer of the energy, each of the plurality of cells 110 is at the ideal operating state and the plurality of cells 110 are balanced.

Referring to the FIG. 3, the controlling unit 235 communicates with each of the first, the second, the third, and the fourth switch 230a-d via the first communication line 325a, the second communication line 325b, the third communication line 325c, and the fourth communication line 325d. Accordingly, the controlling unit 235 selectively operates each of the second, the third, and the fourth switch 230a-d for the respective time periods. In one embodiment, the controlling unit 235 selectively operates each of the first, the second, the third, and the fourth switch 230a-d for the respective time periods based on one of, but not limited to, the equivalent resistance and the ON-state resistance of each of the first, the second, the third, and the fourth switch 230a-d, the voltage set point of each of the first, the second, the third, and the fourth storage unit 120a-d, and a combination thereof.

Accordingly, 432 J of energy from the second cell 110b is transferred to the second storage unit 120b, 144 J of energy from the third cell 110c is transferred to third storage unit 120c, and 301 J of energy from the fourth cell 110d is transferred to fourth storage unit 120d via the first, the second, the third, and the fourth switch 230a-d, respectively. More specifically, the controlling unit 235 operates the second switch 230b for time period (t2)=36.74 to allow transfer of 432 J of energy from the second cell 110b to the second storage unit 120b. Likewise, the controlling unit 235 operates the third switch 230c and the fourth switch 230d for time period (t3)=21.21 seconds and time period (t4)=30.67 seconds, respectively, to allow transfer of 144 J of energy from the third cell 110c to the third storage unit 120c and 301 J of energy from the fourth cell 110d to the fourth storage unit 120d, respectively.

Subsequent to transfer of the energy, state of each of the first, the second, the third, and the fourth cell 110a, 110b, 110c, and 110d is at the ideal operating state, and each of the first, the second, the third, and the fourth cell 110a, 110b, 110c, and 110d is considered to be balanced.

Figure 4F:
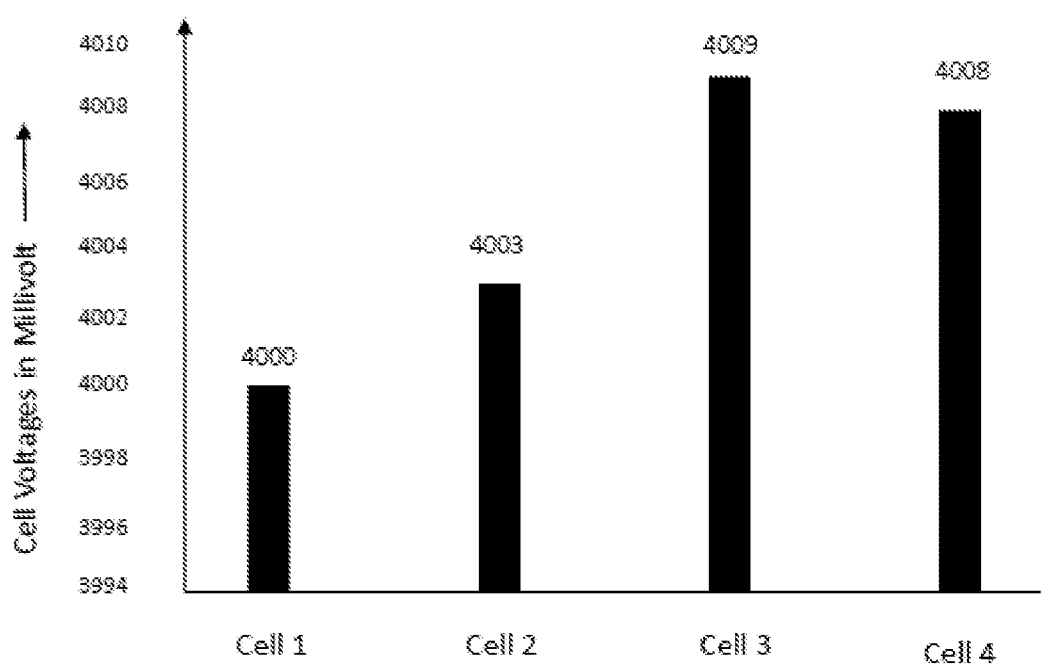
FIG. 4F is a graphical representation of voltage of each cells of the battery pack, of the FIG. 1, at an ideal operating state, in accordance with one or more embodiments of the present invention.
Figure 4:
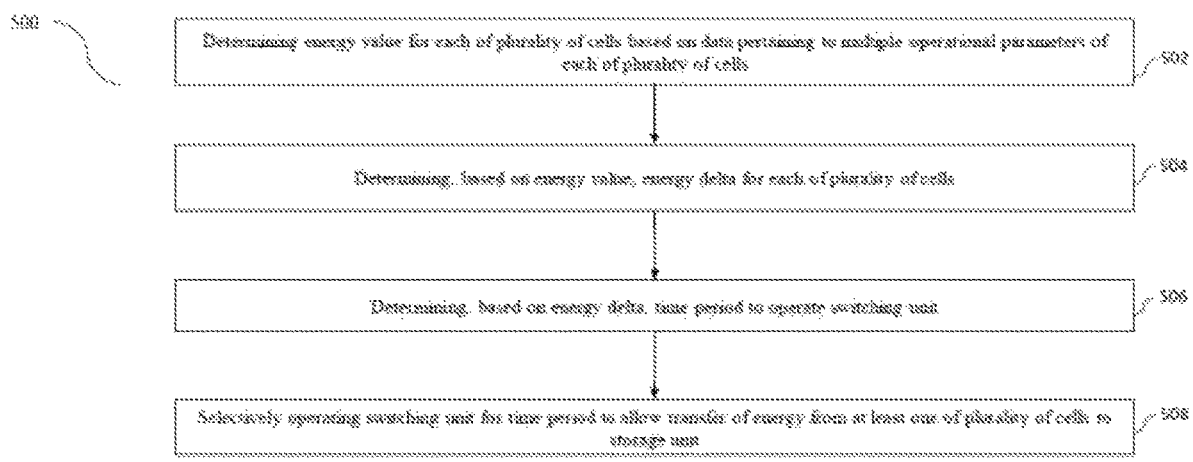

After balancing of each of the first, the second, the third, and the fourth cell 110a, 110b, 110c, and 110d, the controlling unit 235 determines voltage $V_n$ of each of the first, the second, the third, and the fourth cell 110a, 110b, 110c, and 110d, as shown in FIG. 4F. It is evident from the graphs illustrated in FIG. 4F and FIG. 4C, voltage ($V_{1-4}$) of each of the first, the second, the third, and the fourth cell 110a, 110b, 110c, and 110d is below the threshold value and is operating at an ideal operating state.

While aspects of the present invention have been particularly shown and described with reference to the embodiments above, it will be understood by those skilled in the art that various additional embodiments may be contemplated by the modification of the disclosed machines, systems and methods without departing from the scope of what is disclosed. Such embodiments should be understood to fall within the scope of the present invention as determined based upon the claims and any equivalents thereof.

The invention claimed is:

1. A system (115) for balancing a plurality of cells (110) arranged within a battery pack (105), the system (115) comprising:
   a plurality of sensors (210) electrically coupled to the plurality of cells (110) to measure multiple operational parameters of each of the plurality of cells (110);
   a switching unit (215) electrically coupled to each of the plurality of cells (110); and a controlling unit (235) communicably coupled to each of the plurality of sensors (210) and the switching unit (215), the controlling unit (235) configured to:
determine an energy value (E(cell-n)) for each of the plurality of cells (110) based on data pertaining to the multiple operational parameters of each of the plurality of cells (110);
determine, based on the energy value (E(cell-n)), an energy delta (Dn) for each of the plurality of cells (110), wherein the energy delta (Dn) is a difference between the energy value (E(cell-n)) of each of the plurality of cells (110) and a minimal energy value (E(cell-min)) of at least one of the plurality of cells (110); and
selectively operate the switching unit (215) for a time period (tn), the time period (tn) determined based on the energy delta (Dn) for each of the plurality of cells (110) to allow transfer of energy from at least one of the plurality of cells (110) to a storage unit (120), wherein subsequent to transfer of energy, each of the plurality of cells (110) is at an ideal operating state and the plurality of cells (110) are balanced.

2. The system (115) as claimed in claim 1, wherein the ideal operating state is achieved when a voltage delta (VDn) of each of the plurality of cells (110) is lesser than a threshold value, the voltage delta (VDn) is a difference between a voltage value ($V_{(cell-n)}$) of each of the plurality of cells (110) and a minimal voltage value ($V_{(cell-min)}$) of at least one of the plurality of cells (110).

3. The system (115) as claimed in claim 2, wherein the threshold value pertains to a voltage range determined based on a type of the plurality of cells (110).

4. The system (115) as claimed in claim 1, wherein each of the plurality of cells (110) is electrically coupled to each other in one of a series connection, a parallel connection, and a combination thereof.

5. The system (115) as claimed in claim 1, wherein the multiple operational parameters correspond to, but not limited to, current, voltage, and temperature of each of the plurality of cells (110).

6. The system (115) as claimed in claim 1, wherein the storage unit (120) comprises a battery pack.

7. The system (115) as claimed in claim 1, wherein the switching unit (215) is one of, but not limited to, a switch, a transistor, and a MOSFET.

8. The system (115) as claimed in claim 1, wherein the controlling unit (235) selectively operates the switching unit (215) for the determined time period (tn) based on one of, but not limited to, a voltage set point ($VS_{(cap-n)}$) of the storage unit (120), an equivalent resistance/ON-state resistance of the switching unit (215), and a combination thereof.

9. The system (115) as claimed in claim 1, wherein energy transferred from at least one of the plurality of cells (110) to the storage unit (120) is utilized to recharge at least one of the plurality of cells (110).

10. A method (500) of balancing a plurality of cells (110) arranged within a battery pack (105), the method (500) comprising:
determining an energy value (E(cell-n)) for each of the plurality of cells (110) based on data pertaining to multiple operational parameters of each of the plurality of cells (110);
determining, based on the energy value (E(cell-n)), an energy delta (Dn) for each of the plurality of cells (110), wherein the energy delta (Dn) is a difference between the energy value ($E_{(cell-n)}$) of each of the plurality of cells (110) and a minimal energy value ($E_{(cell-min)}$) of at least one of the plurality of cells (110);
determining, based on the energy delta (Dn), a time period (tn) to operate a switching unit (215); and
selectively operating the switching unit (215) for the time period (tn) to allow transfer of energy from at least one of the plurality of cells (110) to a storage unit (120), wherein subsequent to transfer of energy, each of the plurality of cells (110) is at an ideal operating state and the plurality of cells (110) are balanced.

11. The method (500) as claimed in claim 10, wherein the ideal operating state is achieved when a voltage delta (VDn) of each of the plurality of cells (110) is lesser than a threshold value, the voltage delta (VDn) is a difference between a voltage value (V(cell-n)) of each of the plurality of cells (110) and a minimal voltage value (V(cell-min)) of at least one of the plurality of cells (110).

12. The method (500) as claimed in claim 10, wherein selectively operating the switching unit (215) for the determined time period (tn) is based on one of, but not limited to, a voltage set point (VS(cap-n)) of the storage unit (120), an equivalent resistance/ON-state resistance of the switching unit (215), and a combination thereof.

13. The method (500) as claimed in claim 10, wherein energy transferred from the plurality of cells (110) to the storage unit (120) is utilized to one of recharge at least one of the plurality of cells (110), provide energy to a load (125), and a combination thereof.

14. A battery pack (105) comprising:
a plurality of cells (110) arranged within the battery pack (105);
a plurality of sensors (210) electrically coupled to the plurality of cells (110) to measure multiple operational parameters of each of the plurality of cells (110);
a switching unit (215) electrically coupled to each of the plurality of cells (110); and
a controlling unit (235) communicably coupled to each of the plurality of sensors (210) and the switching unit (215), the controlling unit (235) configured to:
receive data, from the plurality of sensors (210) pertaining to the operational parameters of each of the plurality of cells (110);
determine a plurality of energy values (E(cell-n)) based on data pertaining to the multiple operational parameters of each of the plurality of cells (110), wherein each of the plurality of energy values (E(cell-n)) corresponds to one of the plurality of cells (110);
select, a minimal energy value (E(cell-min)) from the plurality of determined energy values;
determine, based on the minimal energy value (E(cell-min)), an energy delta (Dn) for each of the plurality of cells (110), the energy delta (Dn) is a difference between the energy value (E(cell-n)) of each cell and the minimal energy value (E(cell-min));
determine, based on the energy delta (Dn), a time period (tn) for operating the switching unit (215); and
selectively operate the switching unit (215) for the determined time period (tn) to allow transfer of energy from each of the plurality of cells (110) to a storage unit (120) comprising a battery pack or a capacitor, wherein subsequent to transfer of energy, each of the plurality of cells (110) is at an ideal operating state and the plurality of cells (110) are balanced, wherein the ideal operating state is achieved when a voltage delta (VDn) of each of the plurality of cells (110) is lesser than a threshold value.

15. The battery pack of claim 14 wherein:
wherein energy transferred from at least one of the plurality of cells (110) to the storage unit (120) is utilized to recharge at least one of the plurality of cells (110).

16. The battery pack of claim 14 wherein:
wherein energy transferred from at least one of the plurality of cells (110) to the storage unit (120) is utilized to provide energy to a load.

17. The system (115) as claimed in claim 1, wherein the storage unit (120) comprises a capacitor.

18. The system (115) as claimed in claim 1, wherein energy transferred from at least one of the plurality of cells (110) to the storage unit (120) is utilized to provide energy to a load (125).

19. The system (115) as claimed in claim 18, wherein energy transferred from at least one of the plurality of cells (110) to the storage unit (120) is utilized to recharge at least one of the plurality of cells (110).

\* \* \* \* \*